Figure 1:
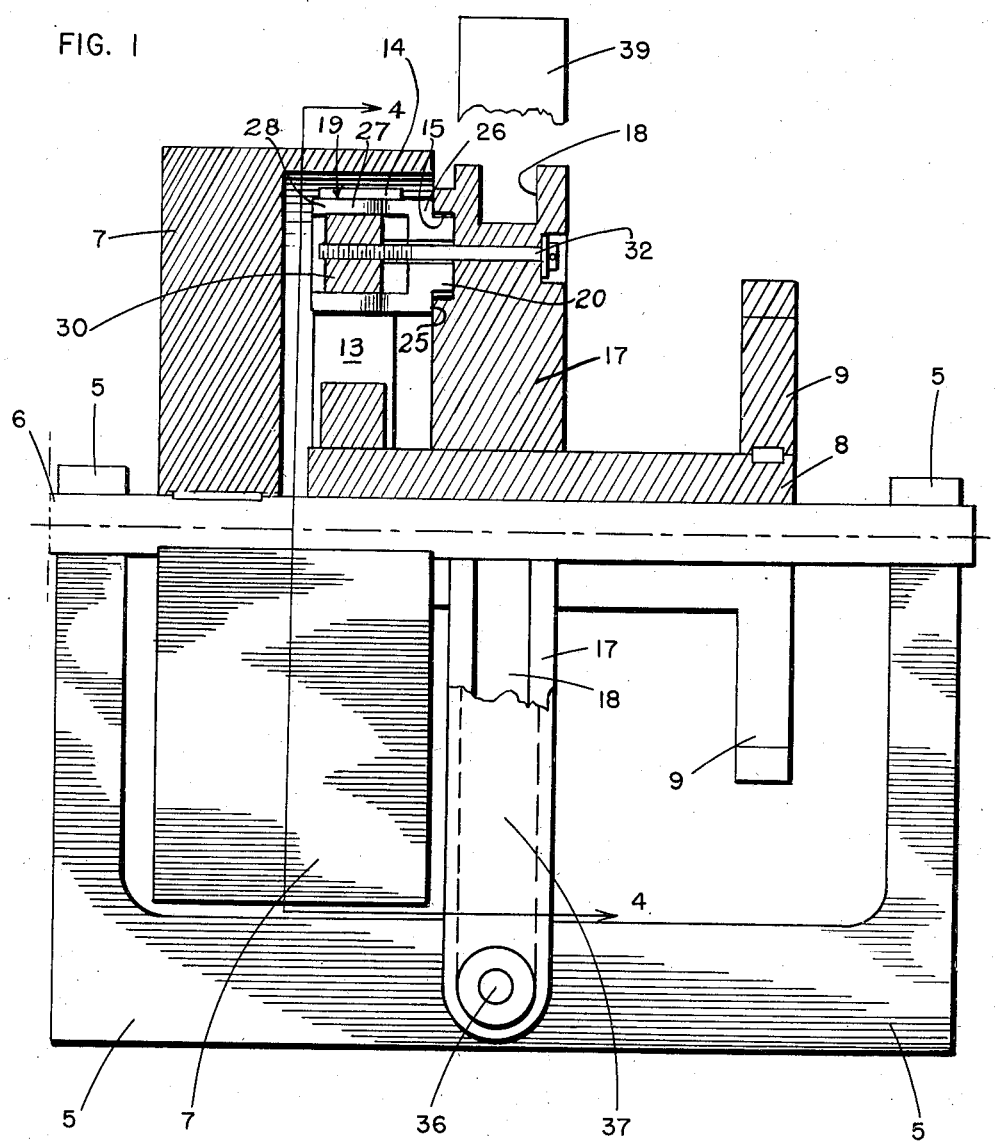

Nov. 22, 1949  W. F. BEARD  2,488,522
CLUTCH OPERATOR

Filed May 17, 1946  3 Sheets-Sheet 1

INVENTOR.
WALTER F. BEARD
BY
William D. Hall
Attorney

Nov. 22, 1949  W. F. BEARD  2,488,522
CLUTCH OPERATOR

Filed May 17, 1946  3 Sheets-Sheet 2

INVENTOR.
WALTER F. BEARD
BY
William D. Hall
Attorney

Nov. 22, 1949 W. F. BEARD 2,488,522
CLUTCH OPERATOR

Filed May 17, 1946 3 Sheets-Sheet 3

INVENTOR.
WALTER F. BEARD
BY
William D. Hall
Attorney

Patented Nov. 22, 1949

2,488,522

UNITED STATES PATENT OFFICE 2,488,522

CLUTCH OPERATOR

Walter F. Beard, Philadelphia, Pa.

Application May 17, 1946, Serial No. 670,401

2 Claims. (Cl. 192—74)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to connecting-and-disconnecting clutches for mechanical power-transmission systems.

Previous mechanical clutches of this type are subject to the disadvantage that they contain one or more manually-operated wedge-shaped elements forming a part of the lever-controlled clutch shift i. e. the hand-operated clutch-engaging-and-disengaging linkage. These wedge-shaped elements had operating-faces which were difficult, if not impossible, to lubricate and which, consequently, wore away rapidly and got out of adjustment. Such out-of-adjustment or worn wedge-shaped operating members were difficult and costly to replace.

It is an object of this invention to provide a new and improved clutch-operating element that will avoid one or more of the disadvantages and limitations of the prior art.

It is a further object of this invention to provide a multi-part clutch-operating element that is readily adjustable to avoid the consequences of wear and which is easily replaceable when worn out or destroyed.

Other and further objects of this invention will be readily apparent to those skilled in the art to which this invention pertains or will become explicit from a consideration of the annexed drawings and specification to which reference is here made for a further and fuller exposition of the present invention.

Figure 2:
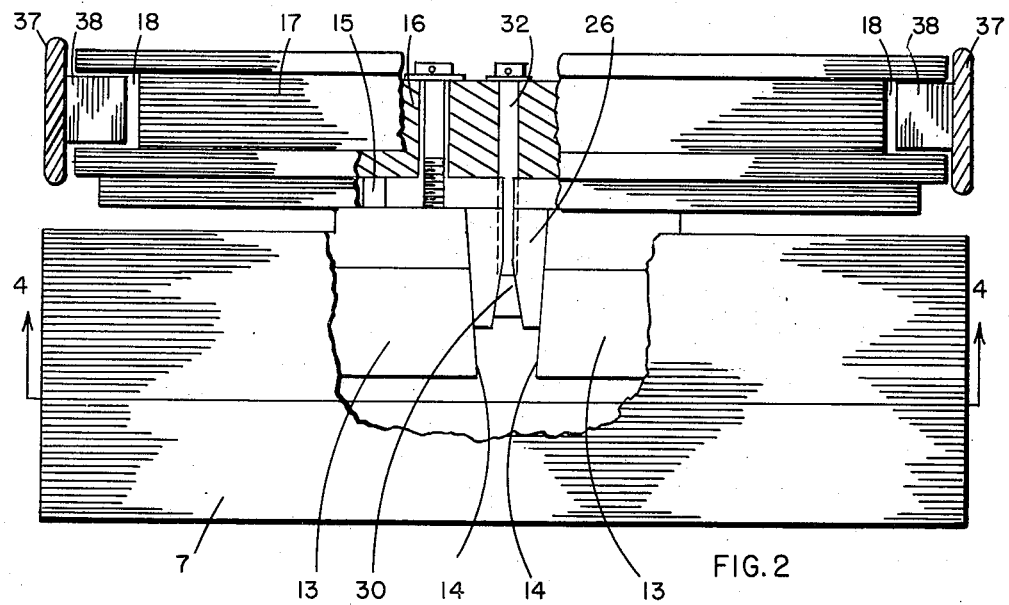
Figure 3:
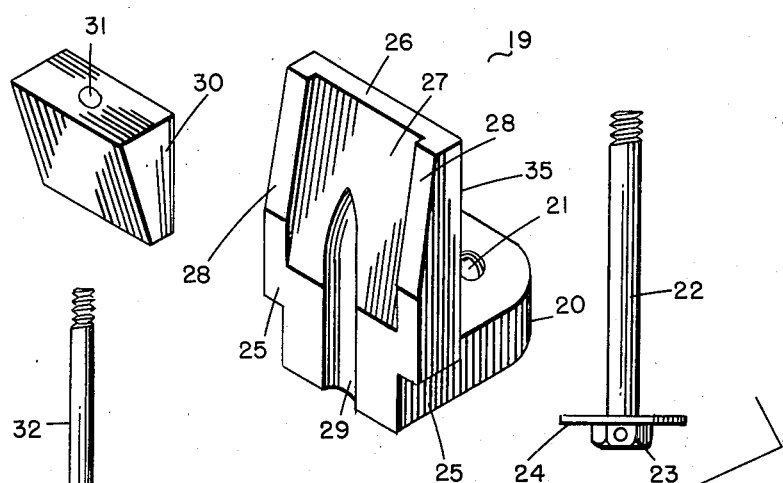
Figure 4:
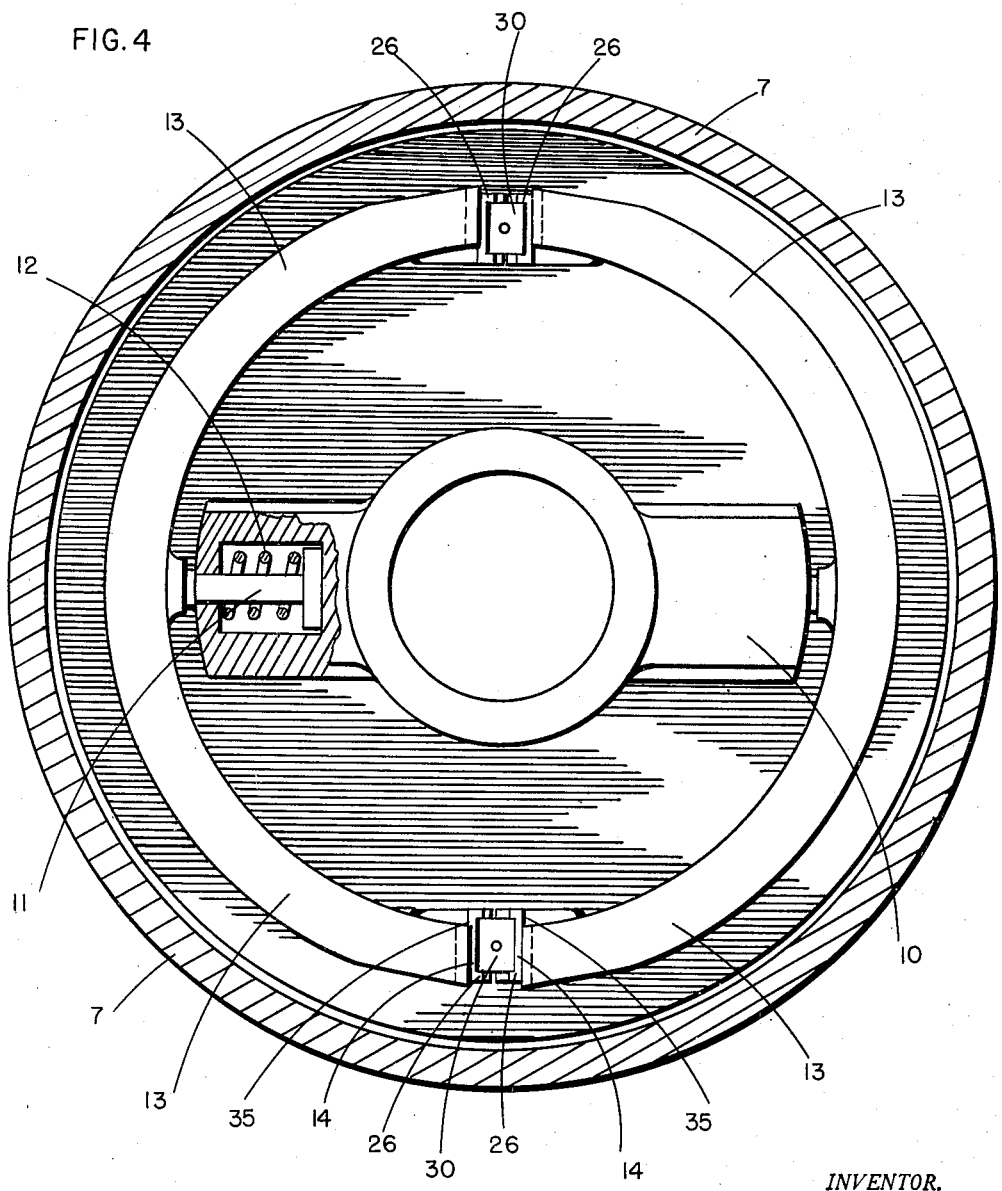

In the drawings, in which like reference characters refer to like parts,

Figure 1 is a view longitudinally of the improved clutch of this invention, the upper half shown in vertical cross-section and the lower half shown in side elevation, and with the handle broken away for clarity, the semi-circular shoes being in expanded, engaging position, Figure 2 is a plan view with some parts broken away vertically and some parts broken away horizontally to show the sides of the wedge-shaped clutch-operating member, the shoes being in retracted, nonengaging position, Figure 3 is an exploded view in isometric projection showing the relative positions of some of the multiple parts of the clutch-operating mechanism, Figure 4 is a transverse vertical cross section on line 4—4 of Figures 1 and 2 with part of one arm broken away, the shoes being in retracted, nonengaging position.

One form of clutch-operating-member constructed according to the present invention has been selected, from among other embodiments which the invention may take, for illustration in the drawings and description in the specification.

One use to which the clutch of the present invention may be put is in a wire-laying and wire-recovering machine having large reels or spools from which wire may be paid out or onto which wire can be wound. A small internal combustion or other engine is used to drive the reels. Between this engine and each of these reels, there is a mechanical transmission line which includes, as a part of it, the manually-operated clutch of this invention. This clutch, when engaged, connects the engine to the reel and, when disengaged, disconnects the engine from the reel.

Figures 1, 2, and 3 of the drawings show the clutch frame 5 which supports a shaft 6 to which is splined or non-rotatably mounted the driving-clutch-drum 7. The driving clutch-drum 7 is connected to a motor or engine, as by a belt, so that the engine drives clutch-drum 7, which in turn, drives the driven clutch assembly and the parts connected under its control.

The driven clutch assembly is rotatably mounted on shaft 6. It consists of assembly-body 8 to one end of which is splined or non-rotatably mounted a sprocket wheel 9 which serves to take off power from the clutch for driving a reel or for any other desired purpose. Clutch assembly-body 8 has a pair of radially extending arms 10 forming a part of it. Arms 10 have radially extending open-ended perforations in them. In these perforations are slidably mounted pins 11 which are stressed by springs 12. The outer ends of the pins 11 form parts of semi-circular shoes 13 which are the clutch faces or clutch engaging-and-disengaging members. These semi-circular shoes 13 terminate in faces 14 which are slanted or sloped with respect to the longitudinal axis of the clutch.

Clutch-assembly body 8 has on its two wedge-shaped clutch operating wedge elements for causing clutch engagement and disengagement. Since these wedge elements are duplicates, a description of one will suffice. Slidably mounted on clutch assembly-body 8 is a ring-shaped shifter 17 having a groove or notch 18 in its outer surface. Shifter 17 has, in its face underlying the ends 14 of the semi-circular shoes 13, a slot or notch 15. From the bottom of this slot or notch 15 and extending through the shifter 17 is a perforation 16. A pair of L-shaped wedge elements 19, which are arranged in pairs so that there are four identical elements in the clutch, are mounted in these slots 15. A description of one of these L-shaped wedge elements 19 will make clear the construction of each of them, as it has already been stated, they are all alike. Each L-shaped wedge element 19 has a flat cross-wise-extending arm 20 adapted for location in slot 15 and having a screw-threaded perforation 21 through it arranged to overlie the end of the elongated perforation 16. A bolt 22 having a head 23 and a flat washer 24 on it can be passed through the elongated perforation 16 and engage with the screw-threaded opening 21 so as to hold the L-shaped wedge element 19 in position. L-shape wedge element 19 has, substantially normal to the arm 20, an arm 26 provided with shoulders 25 which overlie the edges of the slot 15. One face 27 of the arm 26 slopes at an angle to the vertical and is recessed in its center so as to provide a pair of up-standing edges 28. The center portion of the arm 26 is notched or grooved at 29. An adjusting wedge 30 having a screw threaded perforation 31 passing therethrough is mounted so that its wedge-shape faces contact with the sloping faces 27 of two of the L-shape wedge elements 19. A relatively long screw 32 having a head 33 and a flat washer 34 on it engages with the threads in the opening 31. The outer faces 35 of the arms 26 of the L-shaped wedge elements 19 are also sloped at a suitable angle and in a suitable direction to engage the sloping ends 14 of the semi-circular shoes 13. Thus it will be seen that a pair of L-shaped wedge elements 19 underlie the opposing ends 14 of a pair of semi-circular shoes 13.

A pivot 36 supports a manually operable lever 37 which carries a pair of pins 38 which project into the notch or groove 18 in the outer surface of the shifter 17. When the handle 39, which forms the upper or free end of the lever 37, is moved in a direction parallel to the longitudinal axis of the clutch, the shifter 17 is moved by means of the pins 38. The L-shaped elements 19 carried by the shifter 17 contact with the sloping ends 14 of the semi-circular shoes 13 and force the semi-circular shoes 13 out against the stress of springs 12 into engagement with the inner face of the clutch driving drum 7. This causes engagement of the driving and driven parts of the clutch so that a connection is established, for example, between an engine or motor and a wire-carrying reel, so that the motor drives the reel and winds wire onto or off of the reel. When the handle 39 is moved in the opposite direction, the shifter 17 is likewise moved by the pins 38 in the opposite direction and the L-shaped elements 19 move with a sliding engagement of their faces 35 against the sloping faces of the semi-circular shoes 13 so that the springs 12 move the semi-circular shoes out of engagement with the clutch-driving drum 7. This disengages the clutch.

It will thus be seen that, when the sloping faces 35 of the L-shaped wedge elements 19 or the sloping ends 14 of the semi-circular shoes 13 wear, so that the clutch gets out of adjustment, the clutch can be readjusted by loosening the bolts 22 and turning the screw 32 so that the adjusting wedge 30 causes the L-shaped members 19 to move slightly apart. Bolts 22 are then tightened to secure the L-shaped wedge elements 19 in their newly adjusted position. So also, when the L-shaped elements 19 become so badly worn that they are no longer fit for use, the screws 22 and 32 can be loosened and one or more of the L-shaped elements 19 readily replaced. Head 23 of screw 22 and head 33 of screw 32 may each have a hole through it so that a wire or other fastening means can be passed through the heads of these screws to secure them in adjusted position.

It will thus be seen that this invention provides means for relatively adjusting or replacing the clutch-operating element, which is the part of the clutch which most frequently gets out of adjustment or becomes so worn so as to require replacement.

I claim:

1. In a mechanical clutch, an operating member providing for adjustment and replacement in case of wear, said operating member including, a support having a channel in a surface thereof and having perforations in communication with said channel, a pair of L-shaped wedge elements having first arms located in said channel and having second arms back to back, an adjusting wedge located between said second arms of said L-shaped members and providing for adjustment of the spacing of said L-shaped elements, a screw passing through said adjusting wedge and providing adjustment thereof, and a pair of bolts passing through said perforations and securing said L-shaped elements in said channel.

2. A clutch device including a pair of substantially arcuate coaxially disposed shoes, the end faces of said shoes being inclined and opposing each other for wedge operation, a wedge assembly between each opposing pair of said end faces, each of said wedge assemblies including two wedge elements and an adjusting wedge therebetween, said wedge elements each being provided with two inclined surfaces, one for wedging engagement with one of said end faces of one of said shoes and the other for wedging engagement with the adjusting wedge, said wedge elements being movable laterally to vary the distance between them, said adjusting wedge being movable longitudinally between said wedge elements, means to lock the wedge elements and the adjusting wedge of each wedge assembly in operable position, and means to move said wedge assemblies into operating engagement with said shoes to position said shoes laterally.

WALTER F. BEARD.

REFERENCES CITED

The following references are of record in the file of this patent:

UNITED STATES PATENTS

| Number | Name | Date |
| --- | --- | --- |
| 450,746 | Nolan | Apr. 21, 1891 |
| 575,988 | Rauhoff | Jan. 26, 1897 |
| 856,692 | Gadd | June 11, 1907 |
| 945,363 | Barber | Jan. 4, 1910 |
| 1,143,908 | Hewitt | June 22, 1915 |
| 1,686,226 | Conkling | Oct. 2, 1928 |
| 1,708,413 | Fowler | Apr. 9, 1929 |
| 2,388,151 | Hunter | Oct. 30, 1945 |